Figure 1:
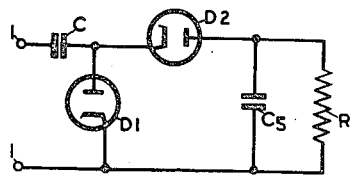

Sept. 11, 1956 E. W. PULSFORD 2,762,974
LOGARITHMIC PULSE RATE METER
Filed Aug. 16, 1950

Inventor
EDGAR WILLIAM PULSFORD,
By
Robert B Larson
Attorney

United States Patent Office 2,762,974
Patented Sept. 11, 1956

2,762,974

LOGARITHMIC PULSE RATE METER

Edgar William Pulsford, Strand, London, England, assignor, by mesne assignments, to National Research Development Corporation, London, England, a corporation of Great Britain Application August 16, 1950, Serial No. 179,765

6 Claims. (Cl. 324—78)

This invention relates to transmission circuits of the kind having a logarithmic characteristic, that is of the kind in which the output voltage or current is logarithmically related to an input signal to be transmitted.

Such circuits are required for example in cases where the signal variation is large and is required to be measured with a uniform percentage error throughout its range or to be utilised in a way such that successive values are significant with respect to their own levels rather than as fractions of the total range.

Logarithmic response has hitherto been sought by the use of electronic valves, rectifiers and resistances having non-linear characteristics. However, reliance cannot be placed on such characteristics remaining stable and reproducible.

The logarithmic transmission circuit of the present invention is not dependent for its operation on selected non-linear characteristics of circuit components. It functions with the aid of electronic valves used either as switches or as linear amplifiers and depends for its accuracy primarily on the impedance values and stabiilty of conventional condensers and resistors.

The transmission circuit of the invention makes use of a train of pulses spaced in time according to the intelligence to be transmitted and delivers a voltage or current which is a measure of the repetition rate on a substantially logarithmic scale.

It is thus directly applicable as a counting rate meter for pulses of non-uniform occurrence rate such as arise in Geiger Muller tubes and other detectors of radio activity, and is suitable for indicating and recording pulse rates with a substantially uniform percentage accuracy over very wide ranges.

Intelligence represented by modulation of other kinds can be handled by first deriving an equivalent time-modulated pulse train by methods well known in the art. A frequency-modulated wave can for example be converted into a time-modulated pulse train by means of a back-biassed electronic valve amplifier, and an amplitude modulation of a D. C. voltage can be converted with the aid of a network of appropriate time constant. The output from the transmission circuit of the invention is in each case an amplitude modulation of direct current logarithmically related to the original modulation, and convertible by well known means to other forms of modulation.

The transmission circuit of the invention operates satisfactorily in a frequency range from 10 up to $10^5$ cycles per second or any part of this range, and extensions of both these limits are possible.

The transmission circuit of the invention comprises in part a condenser alternately charged through one valve on the occurrence of a pulse and discharged into a larger condenser through another valve, this larger condenser being provided with a leakage path so that in equilibrium a voltage is maintained across it which is related to the pulse rate.

It can be shown that the relation is logarithmic over a range of about one decade of the pulse rate, the level of pulse rate at which this logarithmic relation holds being determined by the time constant CR where C is the capacity of the feed condenser (that is the alternately charged and discharged condenser), and R is the resistance of the leakage path.

In pursuance of the invention, a logarithmic relation over a plurality of decades is secured by applying the pulses to a plurality of parallel stages each as above described but with logarithmically graded time constants, and summing the output voltages of, or leakage currents from the larger condensers of the several stages.

In another aspect, a logarithmic relation over a plurality of decades is secured by applying the pulses to a plurality of parallel stages each as above described, the several leakage paths comprising individual equal resistances and a common low impedance in series therewith for the summation of the leakage currents, the time constants being logarithmically graded by grading the feed condenser values and/or by shunting the measured leakage paths by resistances.

The low impedance is preferably provided by a negative feed back amplifier serving as a valve-voltmeter to measure the summation of the currents.

Figure 2:
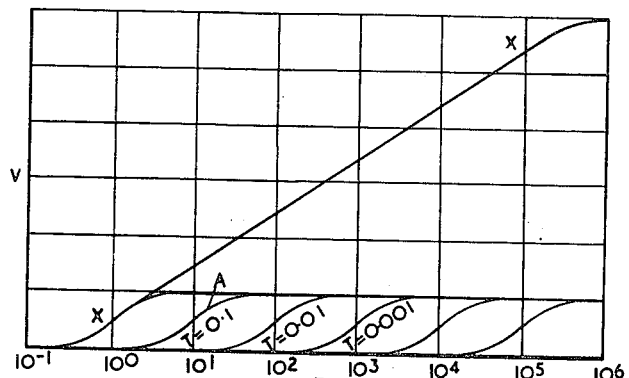
Figure 3:
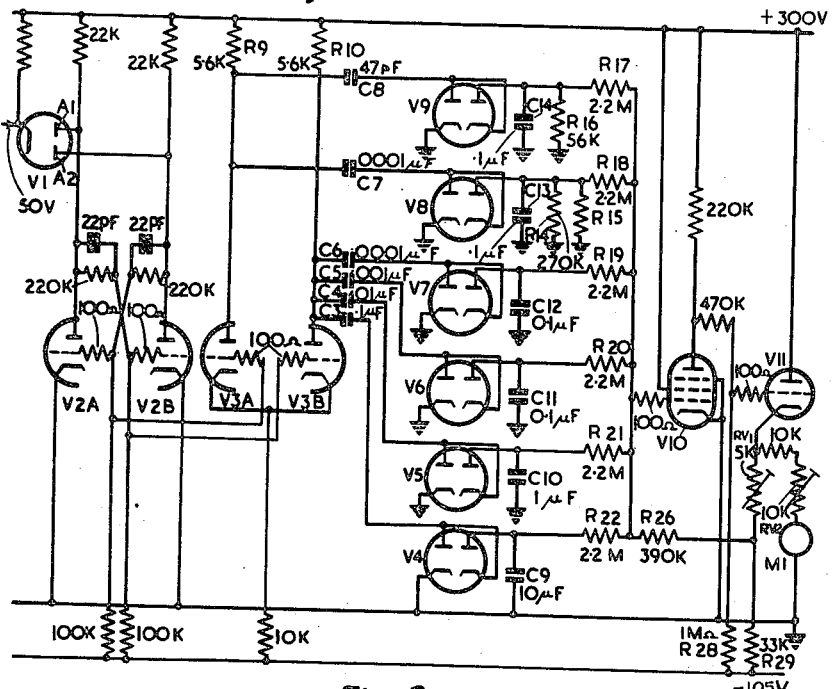

The basic circuit unit underlying the invention is shown in Fig. 1 of the accompanying drawing, Fig. 2 of the drawing is a graph showing the relation between pulse rate and output voltage and Fig. 3 is a circuit diagram of a counting rate meter embodying the invention.

In the circuit, termed a diode pump circuit, shown in Fig. 1 a voltage step V occurring $n$ times per second is applied between input terminals 1. A condenser C is alternately charged through a diode $D_1$ and discharged through a diode $D_2$ into a smoothing condenser $C_s$, on which the voltage increases until the discharge current through a resistance R is just balanced by the charging current through diode $D_2$. When equilibrium is set up, let the voltage across R be $V_1$. The following relationship then holds: $V_1 = nC(V-V_1)R$ whence $$V_1 = \frac{VnT}{1+nT}$$

where $T=CR$.

If values be assigned to T and V (say 0.1 sec. and 100 volts), and values of this expression be calculated, a plot of $V_1$ against $\log n$ is found to be approximately linear for about one decade of $n$ values in the region $n=10$. The curve (marked A in Fig. 2) is asymptotic to $V_1=0$ and $V_1=100$ for $n=0$ and $n=\infty$.

If, in the expression for $V_1$, T is divided by 10, then the same values of $V_1$ are obtained for frequencies $10n$, and the position of the curve is moved one decade towards $n=\infty$. Thus, if a series of circuits in which T differs by a factor 10 in passing from one to the next be used, their individual effects will be as shown in Fig. 2 on the left hand side, where six such curves are shown.

If now the voltages are added for each frequency, the resulting curve is as drawn, and it will be seen that the centre part of this is a straight line (XX) covering about 5 decades. It is on this basis that the logarithmic ratemeter to be described is designed.

The counting rate meter, of which the circuit diagram is shown in Fig. 3, will now be described.

The pulse train or other wave form to be measured is converted into negative pulses of about 50 volts amplitude and one or two microseconds duration, and applied to the cathode of a double diode V1, which together with a double triode V2A, V2B forms a divide-by-two circuit, that is to say V2A, V2B has two symmetrical stable-states and is triggered from one to the other by the incoming pulses. This treatment of the input has advantages when working with random pulses from Geiger counters or proportional counters, since there is no fixed recovery time needed as would be the case with a circuit performing one cycle of operation for each input pulse. A circuit having a fixed recovery time will fail to count pulses coming within that time. The inclusion of the divide-by-two stage prevents this from happening.

The detailed functioning of the divide-by-two circuit comprising valves V1 and V2A, V2B is as follows. V2A is assumed to be initially conducting and V2B cut off. Consequently the anode of V2A and the diode anode connected to it are of low potential, the anode of V2B, the other diode anode A2 and the diode cathode are at a high potential. On the arrival of a negative pulse, diode current flows to the anode A2, the anode potential of V2B and the grid potential of V2A fall, V2A is cut off and V2B is rendered conducting. The change over is rapid because the anode potential of V2A in rising drives the grid of V2B positive which hastens the potential fall of the anode of V2B and the grid of V2A. The anode A2 becomes inoperative and the diode cathode potential rises with that of the anode of V2A. The next pulse reverses the conditions to restore the original state. The outputs from the valves V2A, V2B are stepped voltages, one rising as the other falls.

The circuit of V2A, V2B is designed with low anode loads for fast working. A special feature of the design is that the grid bias voltages are above the cathode voltages, so that in the working state one grid is being driven into grid current and the other is well below cut-off. It is important that the grid swing be limited in the positive direction by the diode action of the grid-cathode section of the valve, as this limited swing assists in producing voltage steps of defined amplitude at the output of the following stage.

The grids of V2A, V2B are directly connected to those of a double triode V3A, V3B, connected as a long-tailed pair, thus ensuring that whichever half of V3A, V3B is conducting, the current in the cathode circuit is constant, within small limits. The cathode current is defined by the grid voltage (limited by V2A, V2B), by the grid base of the triode V3A, V3B, and by the negative voltage to which the cathode load is taken, in this case —105 volts. The only variable here is the grid base of the triodes V3A, V3B, which is unlikely to vary by more than 1 volt with age or changing conditions of use, and so the cathode current is determined to the order of 1% (provided the cathode resistor, which is preferably wire wound, does not change in value).

Now all the cathode current of V3A, V3B passes through one or the other of the anode loads R9, R10, and so, provided that these loads remain constant, the voltage step produced at one anode when the valve is switched over is both defined and constant. As the outputs of both anodes are needed, and it is necessary that they should be equal in amplitude, a matched pair of resistors is used. The circuit values call for a cathode current of 10 ma. and anode voltage steps of about 50 volts.

The outputs then from the anodes of V3A, V3B are stepped voltages of uniform amplitude similar to each other, but of opposite sense.

This stage feeds six paralleled stages each of the form described with reference to Fig. 1 to yield an output dependent on pulse rate.

Each stage comprises a condenser C3—C8, a double diode V4—V9, a larger condenser C9—C14 and a resistance R22—R17.

Four of the stages V4 to V7 are coupled by their condensers C3 to C6 to the anode of valve V3B. A positive-going voltage step at this anode charges the condenser C3 to the full amplitude of the step through the left hand diode of V4 and this charge is maintained for the duration of the step. At the end of the step current flows through the valve V3B and condenser C3 discharges through the right hand diode of V4 and C9. Similarly the condensers C4, C5 and C6 are likewise charged by the positive going step and their charges delivered to the larger condensers C10 to C12 at the end of the stop.

The large condensers C9 to C12 which may be termed smoothing condensers are connected through individual equal resistances R22 to R19 to the input grid of a negative feed back amplifier comprising a pentode V10 and a triode V11 having a milliammeter M1 in its cathode output circuit. This amplifier constitutes a feed-back valve voltmeter, a large fraction of the output being developed across a resistance R29 (the fraction being adjusted by the smaller adjustable resistance RV1) and fed back to the input grid circuit. A change in applied voltage results in a substantial change of output current and the feed back of a nearly equal voltage of opposite sense so that the input grid remains of practically constant voltage. The input circuit of the amplifier, which constitutes the common leakage path for the condensers C9 to C12, is thus of very low impedance, the voltage remaining practically constant despite current changes. The leakage currents from the several condensers flow through this input circuit, the predominant resistance of which is R26, and are summed therein, the summation being measured by the meter M1. A recording meter may be used.

The feed condensers C3 to C6 are logarithmically graded, specific suitable values being 0.1, 0.01, 0.001 and 0.0001 mfd. respectively and in general the corresponding smoothing condenser C9 to C12 is made greater by a common factor, say 100.

The smoothing condensers all reach equilibrium voltages, the individual equilibrium voltages being as shown in Fig. 2.

Each voltage is dropped primarily in the corresponding resistance R22 to R19 to produce a proportional current which is summed by the amplifier.

The condenser values will now be considered in more detail.

In choosing component values for the logarithmic converter circuit shown, a start is made with the smoothing condenser C9, which is made 10 mfd., this being a reasonably large value, without calling for very large or very special components. The feed condenser C3 is made $1/100$ of this (0.1 mfd.), so that the voltage sharing effect will not cause more than about 1% error. (It will be appreciated that the smoothing condenser has two functions: firstly, to hold a steady-state voltage with some precision, and, secondly, to act with the load resistance as a smoothing network of appropriate time constant to reduce statistical inaccuracies when used with random inputs. Both these functions call for a large condenser here, compared with the feed condenser.) The value of the load resistance R22, R21 etc. is chosen so that $nT=1$ when $n$ is some multiple of 10. Since the divide-by-two stage reduces the frequency operating on the converter stages to half that at the input, $n=\frac{1}{2}n$ where $n$ is the input frequency. Hence for a value of C of 0.1 mfd., R becomes 20 MΩ for an $n$ value of 1 C. P. S. and 2 MΩ for an $n$ value of 10 C. P. S.

In the circuit shown, an R value of 2.2 megohms is used and between 10 and about 30 C. P. S. there are inaccuracies. By making $R=4.7$ megohms, these inaccuracies can be transferred into the region below 10 C. P. S., which is not displayed.

The values of the feed condensers in the other stages are obtained by dividing those of the next lower stage by 10. It is not possible to keep strictly to this plan, because it calls for feed condensers C7, C8 of 10 pf. and 1 pf. Instead of using these small values, whose effects would be upset by inevitable stray capacities, 100 pf. and 47 pf. are used and the appropriate fraction of the current is shunted away to earth by resistances R14, R15, R16. Further to reduce the effect of stray capacities, the feed condensers C7 and C8 are connected to the anode of valve V3A instead of to that of V3B which has large stray capacities resulting from the connections to the other stages. It will be seen that valves V3A and V3B give similar outputs so far as the several counting rate stages are concerned.

Furthermore it is appropriate to keep the minimum size of smoothing condenser to 0.1 mfd. This with an output resistance of 2.2 megohms gives a time constant of 0.2 second which is of the same order as that of a normal indicating meter; there is therefore, no reason to reduce any of the smoothing condensers below 0.1 mfd.

Apart from the features mentioned above, the fifth and sixth stages comprising valves V8 and V9 are similar to the other four stages and function in a similar way to add to the current measured by the amplifier V10, V11.

The meter M1 may be a milliammeter of range up to 5 ma. with a dial of six inches in diameter, the scale being divided into four decades. To make the output current and meter readings agree it is necessary to make two scale points agree with the applied frequency. In the experimental work $10^2$ and $10^4$ C. P. S. were used. With the lower input the zero set control RV1 is used to bring the pointer to the $10^2$ scale reading, and with the $10^4$ input, the meter sensitivity control RV2 is similarly used. A fit at both frequencies is obtained after going backwards and forward a few times; once these two points fit, the whole scale fits. With no input the natural equilibrium position of the circuit drives the meter pointer below the 10 C. P. S. point.

I claim:

1. A transmission circuit having a logarithmic characteristic comprising; a plurality of networks each comprising a storage condenser, a charging condenser of smaller capacity than said storage condenser, a unilaterally conducting device connected between one plate of each said condensers for admitting current from said charging condenser to said storage condenser, a second unilaterally conducting device connected between the junction of the charging condenser and the first mentioned conducting device and the other plate of said storage condenser for charging said charging condenser, an input connection to the other plate of said charging condenser and an output connection including a resistance from the plate of the storage condenser connected to the first mentioned unilaterally conducting device; a connection common to all said input connections, a connection common to all said output connections, means for applying a fixed potential to all said other plates of said storage condensers, the time constants of the resistances in the output connections and the charging condenser capacitances of said networks having a logarithmic relationship, a leakage path from said common output connection to said fixed potential, and meter means for indicating the sum of the currents passing through said leakage path.

2. A pulse rate measuring circuit comprising, a transmission circuit as claimed in claim 1, means for deriving voltage steps constant in amplitude from a datum level at a rate related to the pulse rate to be measured, means for applying each of said voltage steps to the common input connection of said transmission circuit and means for measuring the voltage across said leak path.

3. A pulse rate measuring circuit as claimed in claim 2, wherein said means for deriving constant voltage steps comprises a constant amplitude square wave generating circuit having two stable states connected to be changed from a stable state to the other by successive input pulses.

4. A transmission circuit having a logarithmic characteristic, comprising; a plurality of circuit units; an input connection for feeding said circuit units in parallel; and means for continuously summing the current outputs from said circuit units; said circuit units each comprising, a charging condenser connected to said input connection, a storage condenser, unilateral conducting means connected between said charging condenser and said storage condenser for transferring the charge from said charging condenser to said storage condenser for each pulse received in said input connection, a leak resistance connected with said storage condenser, and an output connection including said leak resistance connected with said means for continuously summing the current outputs from said circuit units, the time constants provided by the charging condenser and leak resistance in each circuit unit being logarithmically graded.

5. Logarithmic pulse-rate meter comprising, a triggered pulse generator to produce voltage pulses constant in amplitude from a datum level at a rate related to the pulse rate to be measured, a plurality of feed condensers connected in parallel, means connecting said condensers to said pulse generator to charge said condensers in parallel by said voltage pulses, a plurality of smoothing condensers of greater capacity than said feed condensers, a unilateral conducting circuit connecting each feed condenser to a respective smoothing condenser for transferring the charges on each of said feed condensers to a corresponding one of said smoothing condensers at the end of each of said voltage pulses, a leakage path for each of said smoothing condensers and connected in series with the other ends of said leakage paths to sum the leakage currents, and meter means connected to said common low impedance for indicating the sum of the leakage currents.

6. Pulse ratemeter according to claim 5, including an amplifier having negative feed-back to reduce its output impedance, said amplifier being coupled so that its input impedance constitutes the common low impedance of the said leakage paths.

References Cited in the file of this patent
UNITED STATES PATENTS

| | | |
|---|---|---|
| 2,113,011 | White | Apr. 5, 1938 |
| 2,227,906 | Kellogg | Jan. 7, 1941 |
| 2,413,440 | Farrington | Dec. 31, 1946 |
| 2,496,338 | Barton | Feb. 7, 1950 |
| 2,552,854 | Jacobs | May 15, 1951 |